United States Patent
Nye

[15] 3,652,921
[45] Mar. 28, 1972

[54] LINEARIZED THERMISTOR NETWORKS

[72] Inventor: Lloyd N. Nye, 363 Concord Street, Framingham, Mass. 01701

[22] Filed: July 2, 1970

[21] Appl. No.: 51,995

[52] U.S. Cl. .............................. 323/69, 323/75 N, 323/94 R
[51] Int. Cl. ......................................................... G05f 3/00
[58] Field of Search .................. 323/68, 69, 75 N, 94; 73/362

[56] References Cited

UNITED STATES PATENTS

| | | | |
|---|---|---|---|
| 3,316,765 | 5/1967 | Trolander et al. | 323/75 N X |
| 1,883,613 | 10/1932 | Devol | 323/68 X |
| 3,185,974 | 5/1965 | Doane | 323/68 |

FOREIGN PATENTS OR APPLICATIONS

| | | | |
|---|---|---|---|
| 970,196 | 1958 | Germany | 323/69 |
| 333,012 | 1935 | Italy | 323/69 |

Primary Examiner—Gerald Goldberg
Attorney—John E. Toupal

[57] ABSTRACT

Disclosed are thermistor networks for providing highly linear temperature response. Also disclosed are critical ranges of component value ratios that optimize performance linearity. Particularly described is a network composed of an electrical energy source and source resistor $R_s$ connected across a thermistor circuit including a single thermistor connected in series with another thermistor shunted by a fixed value resistor $R_1$. Optimization is achieved for an important segment of operating temperatures by employing a ratio of $R_1/R_s$ in the range between one and four.

21 Claims, 4 Drawing Figures

PATENTED MAR 28 1972　　3,652,921

Inventor:
Lloyd N. Nye,
by John E. Toupal
Attorney

LINEARIZED THERMISTOR NETWORKS

BACKGROUND OF THE INVENTION

This invention relates generally to electrical networks that exhibit a linear response to temperature and, more particularly, to linearly responsive circuits employing thermistors as temperature sensing elements.

Temperature responsiveness is required in a wide variety of applications including temperature sensing, measurement and compensation. Prime requirements of many temperature responsive devices are sensitivity, simplicity and linearity. Of these requirements, simplicity and sensitivity are well satisfied by the well known thermistor. Consequently, many temperature responsive devices and instruments employ thermistors as temperature sensing elements. One disadvantage of the thermistor, however, it that its response to temperature is approximately exponential rather than linear.

Attempts to linearize the responsiveness of thermistors have resulted in a number of thermistor circuits. The simplest of these comprises a thermistor either shunted or connected in series with a fixed value resistor depending upon whether operation in a constant current or constant voltage mode is desired. Circuits of this type improve linearity but their effectiveness is limited to temperature spans of about 5° to 15° C. Also known are parallel combinations of two or more thermistor elements. As in the case of the single thermistor circuits, the parallel thermistor combinations are either shunted by or connected in series with a fixed value resistor depending upon the mode of operation desired. Examples of linearized plural thermistor circuits are shown in U.S. Pat. No. 3,316,765 of H. W. Trolander et al. issued May 2, 1967. Thermistor circuits of the type disclosed in that patent can provide relatively good linearity of response for temperature spans of up to 50° C. and fair linearity for spans up to 100° C. For example, response curves linear to within ±0.05° C. for spans of 50° C and sensitivities of 0.0057 volts/° C. per volts of supply voltage for 50° C. spans in a range between −5°126 C. and 100°C. have been achieved.

In spite of the improvement in linearity of temperature response provided by the prior thermistor circuits noted above, a need exists for still further improvements in both linearity and sensitivity. The object of this invention, therefore, is to provide thermistor circuits that exhibit for suitable temperature spans greater linearity and sensitivity than previously known thermistor circuits.

SUMMARY OF THE INVENTION

The invention is characterized by the provision of a temperature responsive network having a supply circuit connected across a thermistor circuit including one thermistor connected directly in series with a parallel circuit formed by another thermistor and a shunt resistor of fixed value connected in parallel. The supply circuit includes a source of electrical energy and a source resistor of fixed value that is either connected in series with the energy source or in parallel therewith depending upon the desired mode of operation. Given certain relationships between the values of its various components, this circuit exhibits substantially improved linearity and sensitivity over extended temperature spans.

A featured embodiment of the invention comprises a thermistor network of the above type in which the value of the shunt resistor is greater than the value of the source resistor but less than four times the value of the shunt resistor. Also, the resistance value of the shunted thermistor at a given temperature is at least three times the resistance value of the series thermistor at that temperature but no greater than seven times the resistance value of the series thermistor at that temperature. For temperature spans of 50° C. within the range of 0° C. to 100° C., a thermistor network employing component values within the above limits is capable of temperature responsiveness linear to from ±0.035° C. to ±0.025° C. For the same network the sensitivity will range from 6.7 to 5.1 mvt/° C. per volt of supply voltage.

A more specific invention embodiment of the above type utilizes component values in an even more critical range. This embodiment, which is particularly useful in the temperature range between 0° C. and 100° C., employs a shunt resistor having a value at least 1.1 times the value of the source resistor but no greater than 1.4 times the value of the source resistor.

Still other embodiments of the present invention employ a plurality of additional parallel circuits in series with the first parallel thermistor circuit and each comprising an additional thermistor and fixed value resistor connected in parallel. Provided that suitable relationships are established between various component values, this multiple thermistor circuit is capable of even further improvements of linearity and sensitivity particularly for operation over extended temperature spans. For example, a thermistor network of this type can provide temperature responsive linearity over a span between 0° C. and 100° C. to within ±0.04° C. A critical component value relationship of this circuit is that the additional thermistors disposed in any particular sequence of the additional parallel circuits exhibit increasing values of resistance at a given temperature while the additional shunt resistors disposed in the same particular sequence are of decreasing values.

DESCRIPTION OF THE DRAWINGS

These and other objects and features of the present invention will become more apparent upon a perusal of the following description taken in conjunction with the accompanying drawings wherein.

DESCRIPTION OF THE PREFERRED EMBODIMENTS

Figure 1:
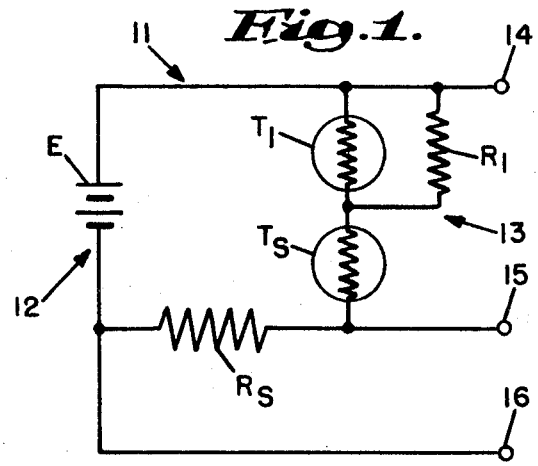
FIG. 1 is a schematic circuit diagram of a preferred constant voltage mode embodiment of the invention.

Referring now to FIG. 1 there is shown a thermistor network 11 including a constant voltage supply circuit 12 connected across a thermistor circuit 13. Forming the thermistor circuit 13 are a first thermistor $T_1$ connected across a first fixed value resistor $R_1$ to form a parallel circuit connected directly in series with a second thermistor $T_s$. The supply circuit 12 includes a voltage source E connected in series with a fixed value source resistor $R_s$. Connected across the thermistor circuit 13 are output terminals 14 and 15 for connecting the network 11 to an output circuit (not shown) in which temperature measurement or compensation is desired. A similar pair of output terminals 15 and 16 are connected across the shunt resistor $R_s$. The output terminals 14 and 15 are used when a negative temperature response is desired and output terminals 15 and 16 are used when a positive temperature response is required.

Figure 2:
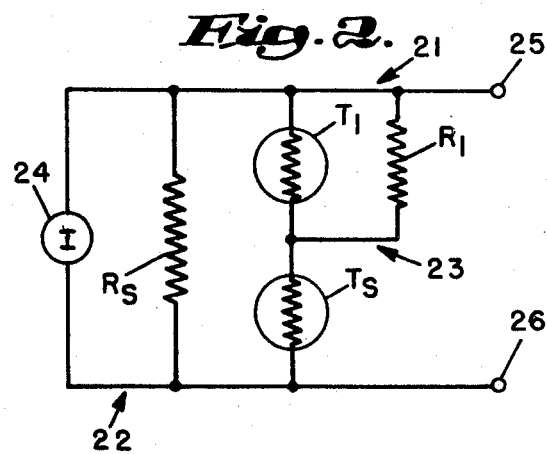
FIG. 2 is a schematic circuit diagram of an analogous constant current mode embodiment of the invention.

FIG. 2 schematically illustrates another thermistor network 21 including a constant current supply circuit 22 connected across a thermistor circuit 23 identical to the thermistor circuit 13 shown in FIG. 1. The supply circuit 22 comprises a constant current source 24 connected in parallel with a source resistor $R_s$. Connected across the thermistor circuit 23 are terminals 25 and 26 for connection to an output circuit (not shown) in which temperature measurement or compensation is desired.

Experimental results have shown that the temperature response of thermistor networks 11 and 21 shown in FIGS. 1 and 2, respectively, is extremely linear if optimized component values are used. It has also been found that although optimized component values differ for operation at different temperatures, certain rather critical component value relationships exist in circuits optimized for operation in a wide

TABLE 2

| Example Number | I | II | III | IV | V | VI | VII | VIII |
|---|---|---|---|---|---|---|---|---|
| Low temp. (° C.) | −40 | −10 | 0 | 20 | 40 | 60 | 100 | 160 |
| High temp. (° C.) | 10 | 40 | 50 | 70 | 90 | 110 | 150 | 210 |
| Linear deviation (±° C.) | .25 | .15 | .035 | .03 | .025 | .02 | .015 | .01 |
| $R_1/R_s$ | 1.10 | 1.3 | 1.28 | 1.29 | 1.32 | 1.35 | 1.43 | 1.92 |
| $R_s$ (Ω) | 24,036 | 14,734 | 4,115 | 3,496 | 1,774 | 947 | 312 | 29 |
| $R_1$ (Ω) | 26,519 | 19,160 | 5,281 | 4,495 | 2,337 | 1,279 | 446 | 57 |
| $T_s$ (KΩ) | 3.75 | 3.75 | 3.75 | 3.75 | 3.75 | 3.75 | 3.75 | 3.75 |
| $T_1$ (KΩ) | 15 | 15 | 15 | 15 | 15 | 15 | 15 | 15 | range of temperatures. Furthermore, the optimized circuits provide a high temperature sensitivity. These factors are demonstrated below in Table I which lists optimized component values and operating results for a number of network examples. The component values and operating results listed in Table I were derived with network 11 shown in FIG. 1. It should be noted, however, that the component values listed apply as well to related components in network 21 (FIG. 2) bearing identical reference characters.

Listed in Table I are the linearities and sensitivities achieved by a number of network examples operated over different spans of temperature. Also listed for each example are optimized values of $R_s$, $R_1$, $T_1$ and $T_s$ and the ratio $R_1/R_s$. Linearity is designated in terms of maximum deviation from linear response in ° C. and sensitivity is listed in terms of millivolts/° C. per volt of supply voltage.

TABLE I

| Example Number | I | II | III | IV | V | VI | VII | VIII |
|---|---|---|---|---|---|---|---|---|
| Low temp. (° C.) | −20 | 0 | 0 | 10 | 35 | 35 | 44 | 50 |
| High temp. (° C.) | 40 | 50 | 100 | 40 | 85 | 90 | 100 | 100 |
| Linear deviation (±° C.) | .2 | .035 | .5 | .005 | .05 | .05 | .03 | .025 |
| Sensitivity (mv./° C./v_s) | 6.4 | 6.7 | 5.3 | 6.9 | 5.5 | 5.3 | 5.1 | 5.1 |
| $R_1$ (ohms) | 2,157 | 1,939 | 588 | 4,350 | 467 | 589 | 292 | 287 |
| $R_s$ (ohms) | 2,712 | 2,382 | 752 | 5,100 | 596 | 752 | 380 | 375 |
| $R_1/R_s$ | 1.26 | 1.23 | 1.28 | 1.17 | 1.28 | 1.28 | 1.31 | 1.31 |
| $T_s$ (KΩ) | 1 | 1 | 1 | 3 | 1 | 1 | 1 | 1 |
| $T_1$ (KΩ) | 5 | 4.1 | 4.9 | 10 | 4.0 | 4.9 | 4 | 4 |

As indicated by Examples II and V-VIII in Table I, the network 11 with optimized component values exhibited maximum deviations from linear response of only between ±0.025 and ±0.035° C. for various 50° C. temperature spans in the temperature range between 0° and 100° C. Even greater linearity was produced over shorter spans as indicated by the ±0.005°C. deviation for the 30° temperature span of Example IV. Although Examples I and III indicate some reduction in linearity, respectively, for a larger span of temperature or for operation below 0° C., the indicated performance is satisfactory for certain applications. Particularly significant in Table I is the fact that the ratio $R_1/R_s$ for all examples lies well within a narrow range of 1.1 to 1.4. This range of component value ratios has been satisfied in all two thermistor circuits optimized for operation in the temperature range between 0° and 100° C. Of further interest in Table I is that for all examples the resistance value of the thermistor $T_1$ is between three and seven times the resistance value of thermistor $T_s$ with all values determined at 25° C. This range also has been satisfied in all optimized circuits.

Table 2, below, lists output linearity and component values for a plurality of optimized networks of the type shown in FIG. 2. It is again to be understood that the component values listed can be used for related identically referenced components in the analogous network 11 shown in FIG. 1. As indicated by Examples III-VIII, excellent linearity is again achieved for 50° C. temperature spans and an even larger temperature range of between 0° and 210° C. is encompassed. Although reasonably good linearity for temperatures below 0° C. is indicated by Examples I and II, it is not believe that the circuits utilized for the examples were fully optimized. The $R_1/R_s$ ratios for Examples I-VI, all entailing temperature spans below 110° C, fall within the above noted range 1.1 to 1.4. Higher optimum $R_1/R_s$ ratios are indicated in Examples VII and VIII for operation at temperatures in the range between 100° and 210° C. However, for optimum performance at even these higher temperatures it has been found that optimum ratios of $R_1/R_s$ lie in a range between one and four. As in the case of Table I, all ratios of $T_1/T_s$ in Table 2 fall within the three to seven range noted above.

Figure 3:
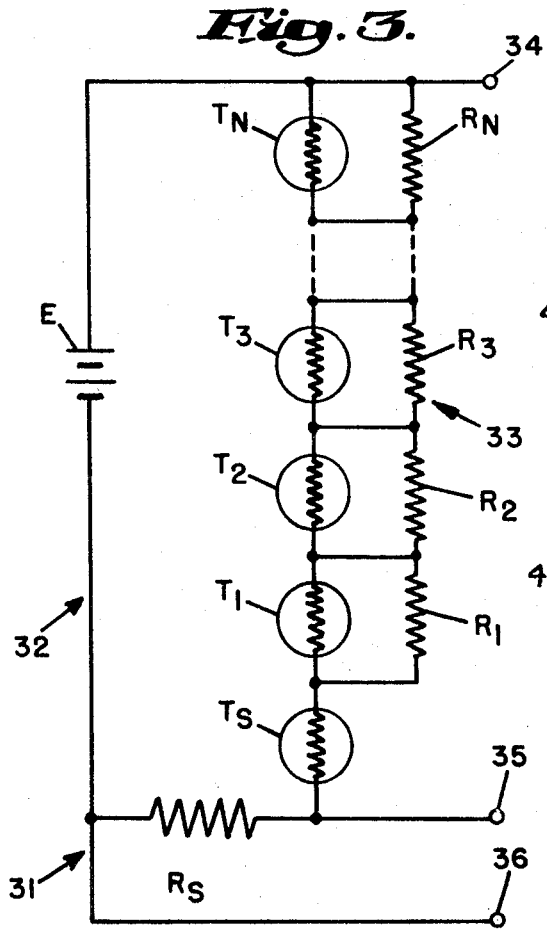
FIG. 3 is a schematic circuit diagram of another constant voltage mode embodiment employing additional thermistor elements.

FIG. 3 schematically illustrates a modified network embodiment 31. As in the network 11 shown in FIG. 1, a constant voltage supply 32 including a voltage source E and source resistor $R_s$ is connected across a thermistor circuit 33 again including a thermistor $T_s$ connected in series with the parallel combination of a thermistor $T_1$ and a fixed value resistor $R_1$. Added to network embodiment 31, however, are additional parallel circuits all connected in series with the parallel circuit formed by thermistor $T_1$ and resistor $R_1$. Each of the additional parallel circuits include a thermistor labeled, respectively, $T_1$, $T_2$, $T_3$...$T_n$ in parallel with a fixed value resistor labeled, respectively, $R_1$, $R_2$, $R_3$...$R_n$. As above, output terminals 34, 35 are provided across the thermistor circuit 33 and output terminals 35, 36 are provided across the source resistor $R_s$.

Figure 4:
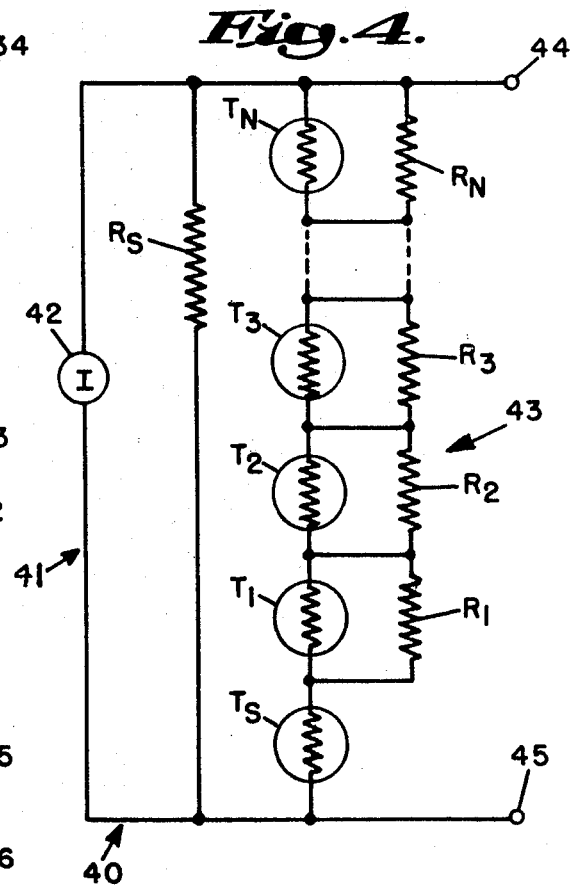
FIG. 4 is a schematic circuit diagram of an analogous constant current mode embodiment employing additional thermistor elements. 31

FIG. 4 schematically illustrates a constant current source network embodiment 40 analogous to the constant voltage source embodiment 31 shown in FIG. 3. A supply circuit 41 including a constant current source 42 and parallel fixed value source resistor $R_s$ is connected across a thermistor circuit 43 which is identical to the thermistor circuit 33 shown in FIG. 3. Output terminals 44 and 45 are connected across the thermistor circuit 43. Again, all common components have been given identical reference characters in each of FIGS. 1-4.

Given optimized component values, the network embodiments 31 and 40 will further enhance linearity of temperature responsiveness, particularly for operations over temperature spans of greater than 50° C. For example, Table 3, below, lists linearities and sensitivities provided by several optimized circuit examples of the type shown in FIGS. 3 and 4. The data listed in Table 3 was derived from circuits employing only the four thermistors designated by characters $T_s$, $T_1$, $T_2$ and $T_3$ in FIGS. 3 and 4. As indicated in the drawings, however, the networks 31 and 40 can be further expanded by the use of additional parallel circuits represented by the elements labeled $T_n$ and $R_n$.

TABLE 3

| Example Number | I | II | III | IV | V |
|---|---|---|---|---|---|
| Low temp. (° C.) | −40 | −30 | −20 | 0 | 0 |
| High temp. (° C.) | 70 | 70 | 80 | 100 | 100 |
| Linearity dev. (±° C.) | .3 | .16 | .16 | .035 | .035 |
| Sensitivity (mv./° C./v_s) | 4.9 | 4.6 | 4.3 | 4.2 | ---- |
| $R_s$ (Ω) | 13,715 | 9,316 | 6,945 | 7,108 | 1,971 |
| $R_1$ (Ω) | 20,151 | 15,558 | 12,422 | 12,295 | 3,607 |
| $R_2$ (Ω) | 8,531 | 5,259 | 3,813 | 3,636 | 1,284 |
| $R_3$ (Ω) | 3,653 | 3,067 | 2,652 | 3,246 | 999 |
| $T_s$ (KΩ) | 3 | 3 | 3 | 3 | 1 |
| $T_1$ (KΩ) | 10 | 10 | 10 | 10 | 3 |
| $T_2$ (KΩ) | 30 | 30 | 30 | 30 | 10 |
| $T_3$ (KΩ) | 100 | 100 | 100 | 100 | 30 |
| $R_1/R_s$ | 1.47 | 1.67 | 1.75 | 1.73 | 1.82 |

The linear deviations listed in Table 3 demonstrate the high level of linearity attainable with networks 31 and 40 in extended operating temperature spans of 100° C. and greater. Particularly good results are obtained in the 0°–100° C. range as indicated by Examples IV and V. Significantly, all tabulated $R_1/R_s$ ratios fall well within a 1.1 to 2 range that was satisfied by all optimized circuits in temperature ranges of interest. The importance of the $R_1/R_s$ ratio is clearly demonstrated by Examples IV and V in which optimized performance is provided over identical 0°–100° C. spans with components of substantially different value but with almost identical $R_1/R_s$ ratios.

Another significant component value relationship is shown by Table 3. Considered in the sequence in which they are tabulated, the listed resistance values of the parallel thermistors $T_1$, $T_2$ and $T_3$ (obtained at 25° C.) increase for each example while their corresponding parallel resistors $R_1$, $R_2$ and $R_3$ decrease in value. This inverse relationship between thermistor and shunting resistor values was found to exist for all optimized circuits.

Obviously, many modifications and variations of the present invention are possible in light of the above teachings. It is, therefore, to be understood that within the scope of the appended claims the invention can be practiced otherwise than as specifically described.

What is claimed is:

1. A circuit linearly responsive to temperature comprising:
   a. a thermistor circuit means comprising a first thermistor means and a first resistor of fixed value connected in parallel with said first thermistor means to form a first parallel circuit, said first thermistor circuit means further comprising a second thermistor means connected directly in series with said first parallel circuit formed by said first thermistor means and said first resistor, and
   b. supply circuit means connected across said thermistor circuit means, said supply circuit means comprising a source of electrical energy and a source resistor of fixed value.

2. A circuit according to claim 1 wherein said source of electrical energy and said source resistor are connected in series.

3. A circuit according to claim 2 including output terminals for connecting the potential across said source resistor into an output circuit.

4. A circuit according to claim 1 wherein said source of electrical energy and said source resistor are connected in parallel.

5. A circuit according to claim 1 wherein the value of said first resistor is greater than the value of said source resistor and less than four times the value of said source resistor.

6. A circuit according to claim 5 wherein the value of said first resistor is at least 1.1 times the value of said source resistor and no greater than 1.4 times the value of said source resistor.

7. A circuit according to claim 6 wherein said source of electrical energy and said source resistor are connected in series.

8. A circuit according to claim 6 wherein said source of electrical energy and said source resistor are connected in parallel.

9. A circuit according to claim 1 wherein the resistance value of said first thermistor means at a given temperature is at least three times the resistance value of said second thermistor means at said given temperature and no greater than seven times the resistance value of said second thermistor means at said given temperature.

10. A circuit according to claim 9 wherein the value of said first resistor is greater than the value of said source resistor and less than four times the value of said source resistor.

11. A circuit according to claim 10 wherein the value of said first resistor is at least 1.1 times the value of said source resistor and no greater than 1.4 times the value of said source resistor.

12. A circuit according to claim 11 wherein said source of electrical energy and said source resistor are connected in series.

13. A circuit according to claim 11 wherein said source of electrical energy and said source resistor are connected in parallel.

14. A circuit according to claim 1 including output terminals for connecting the potential across said first and second thermistor means into an output circuit.

15. A circuit according to claim 1 wherein said thermistor circuit means further comprises a third thermistor means connected across a second resistor to form a second parallel circuit, and said second parallel circuit is connected in series with said first parallel circuit.

16. A circuit according to claim 15 wherein the value of said first resistor is greater than the value of said source resistor and less than four times the value of said source resistor.

17. A circuit according to claim 1 wherein said thermistor circuit further comprises a plurality of additional parallel circuits connected in a series circuit with said first parallel circuit, each of said additional parallel circuits comprising an additional thermistor means and a fixed value additional resistor connected in parallel therewith.

18. A circuit according to claim 17 wherein said additional thermistor means disposed in a particular sequence of said additional parallel circuits exhibit increasing values of resistance at a given temperature, and said additional resistors disposed in said particular sequence are of decreasing value.

19. A circuit according to claim 18 wherein the value of said first resistor is greater than the value of said source resistor and less than four times the value of said source resistor.

20. A circuit according to claim 19 wherein the value of said first resistor is at least 1.1 times the value of said source resistor and no greater than two times the value of said source resistor.

21. A circuit according to claim 18 wherein the resistance value of said first thermistor means at a given temperature is at least three times the resistance 31 value of said second thermistor means at said given temperature and no greater than seven times the resistance value of said second thermistor means at said given temperature.

* * * * *